UNITED STATES PATENT OFFICE.

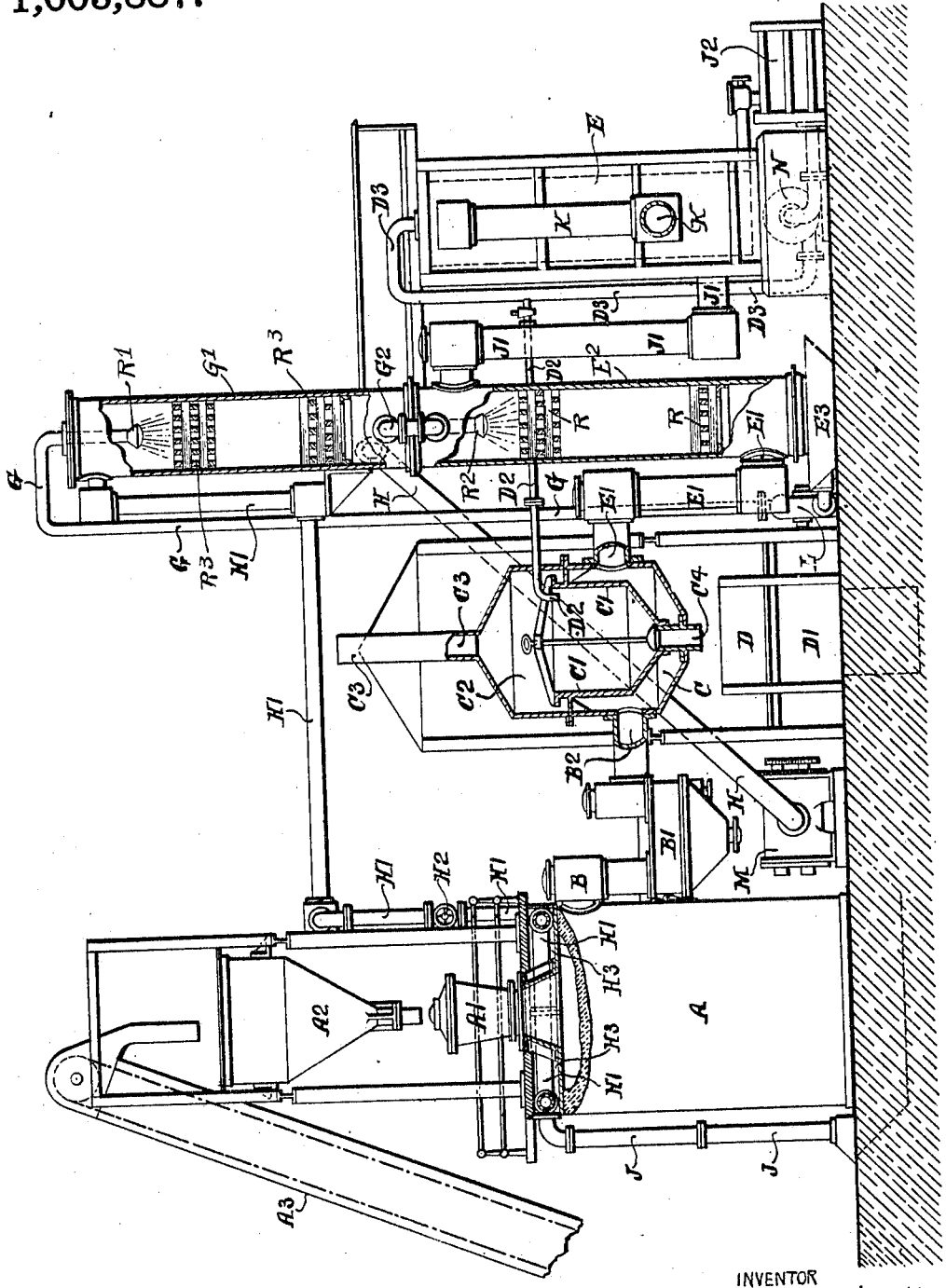

ALFRED BARKER DUFF, OF PITTSBURG, PENNSYLVANIA.

APPARATUS FOR RECOVERING AMMONIA.

1,003,887.

Specification of Letters Patent. Patented Sept. 19, 1911.

Application filed February 9, 1910. Serial No. 542,849.

*To all whom it may concern:*

Be it known that I, ALFRED BARKER DUFF, a subject of the King of Great Britain and Ireland, and a resident of Pittsburg, Pennsylvania, United States of America, have invented certain new and useful Improvements in Apparatus for the Recovery of Ammonia from Gas-Producer Gas, of which the following is the specification.

This invention has for its object to improve the process and simplify the apparatus used in the recovery of ammonia from gas producer gas.

As is known, the ordinary process for the production of ammonia by the combustion of coal in a gas producer in the presence of steam requires the introduction into the producer of a volume of steam largely in excess of that required for the conversion of the nitrogen of the coal into ammonia, in order to prevent the decomposition of the ammonia by heat. Further in the ordinary recovery plant steam is also required to boil down the weak sulfate of ammonia produced by treating the gas with a weak sulfuric acid solution. The large volume of steam thus required is usually raised in separate boiler plant consuming a large amount of additional fuel to that gasified. The expenditure for this additional fuel therefore renders the process wasteful and uneconomical to that extent. The temperature of the gas leaving the producer is considerable, and according to the present invention by the provision of an improved construction and arrangement of plant, the sensible heat of the gas issuing from the producer is first utilized for the boiling down of the weak sulfate liquor and second for the production of the steam, or nearly all of the steam, and for the heating of the air required in the producer before the gas passes to the ammonia recovery tower. By this particular sequence of operations and plant not only is economy in working effected but the recovery plant is also lessened and the process shortened.

A simple example of the improved construction of plant is shown in elevation partly in section on an accompanying sheet of explanatory drawings.

As shown in the drawings the gas producers, of which only one A is shown, are fed with fuel as usual each by a central hopper $A^1$ charged when required from an overhead hopper $A^2$ to which the fuel is raised by the usual elevator $A^3$. The gas generated, on leaving each producer passes by a pipe B into the usual collecting and dust separating main $B^1$. From the main the gas is led by a pipe $B^2$ to the interior of a casing C surrounding a boiling down pan $C^1$. This pan is of usual construction, that is, it is fitted with an overhead vapor collecting canopy $C^2$ and vapor discharge pipe $C^3$ and a valve controlled outlet $C^4$ through which the crystals and liquor formed are discharged to a drainer D, beneath which is the usual liquor well $D^1$. A valve controlled pipe $D^2$ leads from the pipe $D^3$ by means of which circulation is kept up in the ammonia recovery tower E, as hereinafter described, so that the weak sulfate liquor produced in that tower in the usual manner, may pass when required by the pipe $D^2$ to the boiling down pan $C^1$. Only a small amount of the heat in the gas within the casing C is required to expeditiously boil down this liquor, so that the gas leaves this casing still having a considerable portion of its sensible heat. From the casing C the gas passes by a pipe connection $E^1$ to and enters the bottom of a gas washing and heat exchanging tower $E^2$, this tower being filled with batten checkerwork R or the like. Water is admitted, as hereinafter described, to the top of this tower and falls through it so that the water is brought into intimate contact with the gases ascending therethrough, and as the heat in the gas is ample for the purpose, the temperature of the water is raised to or near boiling point, at the same time the water washes out the dust and a portion of the tars which the gas held in a fluid condition. On reaching the bottom of the tower, the water and tars fall into a tank $E^3$ luting the bottom of the tower, and the water is drawn from this tank by a centrifugal pump L and forced up a pipe G to the top of a second tower $G^1$ placed above the gas washing tower, the water entering this tower through a spray device $R^1$ in its upper end, and leaving the bottom thereof through a pipe connection $G^2$, communicating through a spray device $R^2$ with the interior of the lower tower $E^2$ at the top of the latter. The upper tower is also filled with batten checkerwork $R^3$ or the like. Air from a blower M enters the bottom of the upper tower $G^1$ through a pipe H, and as the air and the boiling water pass through this upper tower in opposite directions, not only is the air highly heated but all, or a very large amount of, the steam required in the producer passes off from the tower with this heated air through the pipe connections H¹. The end of these pipe connections next the producer is fitted with a regulating valve H² and enters what may be termed a false top, or inclosed space H³ formed in the top of the producer, so that advantage may thus be taken of the great heat at that part of the producer to superheat the mixture of air and steam. From this inclosed space H³ the air and steam is led by a pipe J communicating as usual with the interior of the producer.

As hereinbefore described, the water after parting with most of its heat and steam to the air passing through the upper tower G¹, passes by the pipe connection G² into the gas washing tower E² and is there re-heated to or near the boiling point and again forced by the pump L through the pipe G to the upper end of the upper tower G¹, the circulation thus being continuous. When the gas leaves the washing tower E², its temperature is then sufficiently reduced to permit of it being treated in the ordinary ammonia recovery tower, and from the gas washing tower E² the gas passes by pipe connections J¹ to the bottom of the ammonia recovery tower E where it is treated as usual with a weak sulfuric acid solution to produce the weak sulfate of ammonia, the solution being kept in circulation by a centrifugal pump N drawing the liquid from the usual acid tank J² and forcing it by the pipe D³ to the top of the ammonia recovery tower E. From this tower the gas passes through the usual main K either direct to a receiver or through mechanical washing plant of any desired form, depending on the use to which it is to be put.

What I claim is:—

1. In apparatus for the recovery of ammonia from gas producer gas, the combination in the following sequence of a gas producer, a liquid concentrating device for boiling down the weak solution of ammonium sulfate, means for raising at least some of the steam and for heating the air required in the gas producer, and an ammonia recovery tower in which the cooled gas is treated as usual.

2. In apparatus for the recovery of ammonia from gas producer gas, the combination in the following sequence of a gas producer, a liquid concentrating device for boiling down the weak solution of ammonium sulfate, a heat interchanger in which water is heated to or near the boiling point, and an ammonia recovery tower in which the cooled gas is treated as usual, together with a second heat interchanger connected to said first heat interchanger, means for producing therein the mixture of air and steam required in the gas producer, and means for leading said mixture of air and steam to the gas producer.

3. In apparatus for the recovery of ammonia from gas producer gas, the combination in the following sequence of a gas producer, a liquid concentrating device for boiling down the weak solution of ammonium sulfate, a heat interchanger in which water is heated to or near the boiling point, and an ammonia recovery tower in which the cooled gas is treated as usual, together with a second heat interchanger connected to said first heat interchanger, means for producing therein the mixture of air and steam required in the gas producer, a superheater and means for leading the mixture of air and steam through said superheater to the gas producer.

4. In apparatus for the recovery of ammonia from gas producer gas, the combination in the following sequence of a gas producer, a liquid concentrating device for boiling down the weak solution of ammonium sulfate, a heat interchanger in which water is heated to or near the boiling point, and an ammonia recovery tower in which the cooled gas is treated as usual, together with a second heat interchanger arranged above said first heat interchanger, means for leading the heated water from the lower to the top of the upper heat interchanger, means for leading up through said second heat interchanger a counter-current of air whereby a mixture of air and steam is secured and means for leading this mixture to the gas producer.

5. In apparatus for the recovery of ammonia from gas producer gas, the combination in the following sequence of a gas producer, a liquid concentrating device for boiling down the weak solution of ammonium sulfate, a heat interchanger in which water is heated to or near the boiling point, and an ammonia recovery tower in which the cooled gas is treated as usual, together with a second heat interchanger arranged above said first heat interchanger, means for leading the heated water from the lower to the top of the upper heat interchanger, means for leading up through said second heat interchanger a counter-current of air whereby a mixture of air and steam is secured, means for leading the cooled water from the upper to the lower heat interchanger to wash the gas therein so that the circulation is continuous, and means for leading the mixture of air and steam from the upper heat interchanger to the gas producer.

6. In apparatus for the recovery of ammonia from gas producer gas, the combination in the following sequence of a gas producer, a liquid concentrating device for boiling down the weak solution of ammonium sulfate, a heat interchanger in which water is heated to or near the boiling point, and an ammonia recovery tower in which the cooled gas is treated as usual, together with a second heat interchanger arranged above said first heat interchanger, means for leading the heated water from the lower to the top of the upper heat interchanger, means for leading up through said second heat interchanger a counter-current of air whereby a mixture of air and steam is secured, a superheater and means for leading the mixture of air and steam from the upper heat interchanger through said superheater to the gas producer.

7. In apparatus for the recovery of ammonia from gas producer gas, the combination in the following sequence of a gas producer, a liquid concentrating device to which the weak solution of ammonium sulfate is led from the recovery tower, a heat interchanger in which at least part of the steam required for the gas producer is raised, and an ammonia recovery tower to which is led the gas cooled in the heat interchanging tower.

In testimony whereof I have signed my name to this specification, in the presence of two subscribing witnesses.

ALFRED BARKER DUFF.

Witnesses:
JAMES BURNS,
ROBERT HENRY HILL.